United States Patent
Mae et al.

(10) Patent No.: US 9,788,148 B2
(45) Date of Patent: Oct. 10, 2017

(54) NON-TRANSITORY STORAGE MEDIUM ENCODED WITH COMPUTER READABLE INFORMATION PROCESSING PROGRAM, INFORMATION PROCESSING APPARATUS, METHOD OF CONTROLLING INFORMATION PROCESSING APPARATUS, AND INFORMATION PROCESSING SYSTEM, CAPABLE OF ENHANCING ZEST OF WIRELESS COMMUNICATION

(71) Applicant: NINTENDO CO., LTD., Kyoto-shi, Kyoto (JP)

(72) Inventors: Kenichi Mae, Kyoto (JP); Yoshihisa Kondo, Kyoto (JP); Masaru Shimomura, Kyoto (JP); Yoshitaka Imura, Kyoto (JP); Masahiro Shoji, Kyoto (JP); Takayuki Shibata, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 14/472,980

(22) Filed: Aug. 29, 2014

(65) Prior Publication Data
US 2015/0172857 A1    Jun. 18, 2015

(30) Foreign Application Priority Data
Dec. 12, 2013 (JP) .................... 2013-257334

(51) Int. Cl.
*H04B 1/00* (2006.01)
*H04B 7/00* (2006.01)
(Continued)

(52) U.S. Cl.
CPC .......... *H04W 4/02* (2013.01); *H04W 76/023* (2013.01)

(58) Field of Classification Search
None
See application file for complete search history.

(56) References Cited

U.S. PATENT DOCUMENTS 6,671,512 B2 * 12/2003 Laakso ............... H04W 52/346
455/450
8,195,229 B2 * 6/2012 Rofougaran ............. H04B 1/40
340/539.1
(Continued)

FOREIGN PATENT DOCUMENTS

JP    2008-507883 A    3/2008
JP    2012-139362    7/2012
(Continued)

OTHER PUBLICATIONS

Ramanathan et al., "Topology Control of Multihop Wireless Networks Using Transmit Power Adjustment", IEEE Infocom 2000, pp. 404-413.

*Primary Examiner* — Tuan A Tran
(74) *Attorney, Agent, or Firm* — Nixon & Vanderhye, P.C.

(57) ABSTRACT

A non-transitory storage medium encoded with a computer readable information processing program executable by a computer of an information processing apparatus, causing one or more processors to perform an obtaining module obtaining information on a state of the information processing apparatus or on a state of surroundings of the information processing apparatus, a setting module setting a communication condition for wireless communication based on the obtained information, and a data communication module carrying out at least one of transmission and reception of data through wireless communication with another information processing apparatus within coverage by using the set communication condition.

6 Claims, 22 Drawing Sheets

(51) Int. Cl.
*H04W 4/02* (2009.01)
*H04W 76/02* (2009.01)

(56) References Cited

U.S. PATENT DOCUMENTS

| | | | | |
|---|---|---|---|---|
| 8,369,445 | B2* | 2/2013 | Hensley | H04L 1/0026 |
| | | | | 342/175 |
| 8,472,997 | B2* | 6/2013 | Zhang | H03G 3/3042 |
| | | | | 455/127.1 |
| 8,538,435 | B2* | 9/2013 | Immendorf | H04W 24/00 |
| | | | | 455/436 |
| 8,781,420 | B2* | 7/2014 | Schlub | H01Q 1/243 |
| | | | | 455/115.1 |
| 8,812,010 | B2* | 8/2014 | Nakamura | H04W 16/08 |
| | | | | 370/331 |
| 8,862,140 | B2* | 10/2014 | Khaitan | H04W 52/16 |
| | | | | 455/418 |
| 9,432,881 | B2* | 8/2016 | Zhang | H04W 28/085 |
| 2008/0055068 | A1 | 3/2008 | Van Wageningen et al. | |
| 2008/0242354 | A1 | 10/2008 | Rofougaran | |
| 2011/0250928 | A1* | 10/2011 | Schlub | H01Q 1/243 |
| | | | | 455/550.1 |
| 2012/0021800 | A1* | 1/2012 | Wilson | H04W 52/146 |
| | | | | 455/550.1 |
| 2012/0164946 | A1 | 6/2012 | Fujiwara et al. | |
| 2012/0302249 | A1* | 11/2012 | Ch'ng | H04W 16/16 |
| | | | | 455/450 |
| 2013/0109390 | A1* | 5/2013 | Tokgoz | H04W 16/08 |
| | | | | 455/436 |
| 2013/0303232 | A1* | 11/2013 | Thomas | H04W 52/146 |
| | | | | 455/550.1 |

FOREIGN PATENT DOCUMENTS

| | | |
|---|---|---|
| JP | 2013-080286 A1 | 5/2013 |
| JP | 2013-123168 A | 6/2013 |
| WO | WO 2013/152319 A | 10/2013 |

* cited by examiner

OTHER INFORMATION
PROCESSING APPARATUSES

FIG.4

| COMMUNICATION CONDITION SETTING DATA ||
|---|---|
| REGION | COVERAGE |
| OSAKA | COVERAGE PA1 (RECEPTION SENSITIVITY T1 / ANTENNA OUTPUT POWER P1) |
| TOKYO | COVERAGE PA0 (RECEPTION SENSITIVITY T0 / ANTENNA OUTPUT POWER P0) |
| HOKKAIDO | COVERAGE PA2 (RECEPTION SENSITIVITY T2 / ANTENNA OUTPUT POWER P2) |
| ⋮ | ⋮ |

| COMMUNICATION CONDITION SETTING DATA ||
|---|---|
| STATE | COVERAGE |
| CROWDED | COVERAGE PC0 (RECEPTION SENSITIVITY T6, ANTENNA OUTPUT POWER P6) |
| LESS CROWDED | COVERAGE PC1 (RECEPTION SENSITIVITY T7, ANTENNA OUTPUT POWER P7) |

(B)

| COMMUNICATION CONDITION SETTING DATA ||
|---|---|
| STATE | COVERAGE |
| STATIONARY | COVERAGE PB0 (RECEPTION SENSITIVITY T3, ANTENNA OUTPUT POWER P3) |
| WALKING | COVERAGE PB1 (RECEPTION SENSITIVITY T4, ANTENNA OUTPUT POWER P4) |
| RUNNING | COVERAGE PB2 (RECEPTION SENSITIVITY T5, ANTENNA OUTPUT POWER P5) |

(C)

| COMMUNICATION CONDITION SETTING DATA |||
|---|---|---|
| REGION | STATE | COVERAGE |
| OSAKA | STATIONARY | COVERAGE PA1A |
| | WALKING | COVERAGE PA1B |
| | RUNNING | COVERAGE PA1C |
| TOKYO | STATIONARY | COVERAGE PA0A |
| | WALKING | COVERAGE PA0B |
| | RUNNING | COVERAGE PA0C |
| HOKKAIDO | STATIONARY | COVERAGE PA2A |
| | WALKING | COVERAGE PA2B |
| | RUNNING | COVERAGE PA2C |
| ⋮ | ⋮ | ⋮ |

FIG.15

| COMMUNICATION CONDITION SETTING DATA ||
|---|---|
| REGION | COVERAGE |
| OSAKA | COVERAGE PD1 (DISTANCE D1) |
| TOKYO | COVERAGE PD0 (DISTANCE D0) |
| HOKKAIDO | COVERAGE PD2 (DISTANCE D2) |
| ⋮ | ⋮ |

FIG.22

| COMMUNICATION CONDITION SETTING DATA ||
|---|---|
| APPLICATION NAME | COVERAGE |
| APPLICATION A | COVERAGE PE1(DISTANCE D3) |
| APPLICATION B | COVERAGE PE2(DISTANCE D4) |
| APPLICATION C | COVERAGE PE3(DISTANCE D5) |

NON-TRANSITORY STORAGE MEDIUM ENCODED WITH COMPUTER READABLE INFORMATION PROCESSING PROGRAM, INFORMATION PROCESSING APPARATUS, METHOD OF CONTROLLING INFORMATION PROCESSING APPARATUS, AND INFORMATION PROCESSING SYSTEM, CAPABLE OF ENHANCING ZEST OF WIRELESS COMMUNICATION

This nonprovisional application is based on Japanese Patent Application No. 2013-257334 filed with the Japan Patent Office on Dec. 12, 2013, the entire contents of which are hereby incorporated by reference.

FIELD

The present disclosure relates to a non-transitory storage medium encoded with a computer readable information processing program, an information processing apparatus, a method of controlling an information processing apparatus, and an information processing system, and to control of communication processing between/among information processing apparatuses.

BACKGROUND AND SUMMARY

A system capable of providing data which can be made use of in an application to another information processing apparatus through wireless communication has conventionally been known.

For example, in the system above, data which can be made use of in an application is exchanged between/among information processing apparatuses from a communication counterpart through wireless communication, so that the data can be made use of in each information processing apparatus. Depending on an environment of an information processing apparatus, however, the number of times of communication with a communication counterpart may be too large or small, which may interfere zest of wireless communication.

An object of the present disclosure is to solve the problem as described above, and to provide a non-transitory storage medium encoded with a computer readable information processing program, an information processing apparatus, a method of controlling an information processing apparatus, and an information processing system, capable of enhancing zest of wireless communication.

An exemplary embodiment provides a non-transitory storage medium encoded with a computer readable information processing program executable by a computer of an information processing apparatus having a wireless communication function, causing one or more processors to perform an obtaining module obtaining information on a state of the information processing apparatus or a state of surroundings of the information processing apparatus, a setting module setting a communication condition for wireless communication based on the obtained information, and a data communication module carrying out at least one of transmission and reception of data through wireless communication with another information processing apparatus within coverage by using the set communication condition.

In the exemplary embodiment, the setting module may change coverage of a wireless device in accordance with the communication condition for wireless communication based on the obtained information.

In the exemplary embodiment, the setting module may change at least any one of transmission output power and reception sensitivity of the wireless device based on the obtained information.

In the exemplary embodiment, the obtaining module obtains a plurality of pieces of information on the state of the information processing apparatus, the state of the surroundings of the information processing apparatus, or combination thereof, and the setting module may set the communication condition for wireless communication based on the obtained plurality of pieces of information.

In the exemplary embodiment, the obtaining module obtains position data on a position of the information processing apparatus, and the setting module may set the communication condition for wireless communication based on the obtained position data.

In the exemplary embodiment, the information processing apparatus has a storage portion, the storage portion stores history information on history of wireless communication with another information processing apparatus, and the setting module may set the communication condition for wireless communication based on the obtained information and the history information stored in the storage portion.

In the exemplary embodiment, the obtaining module obtains apparatus state data representing a posture or motion of the information processing apparatus, and the setting module may set the communication condition for wireless communication based on the obtained apparatus state data.

In the exemplary embodiment, the obtaining module obtains sensing data from a sensor sensing the state of the information processing apparatus, and the setting module may set the communication condition for wireless communication based on the obtained sensing data.

In the exemplary embodiment, the information processing apparatus causes the computer to further function as a condition obtaining module obtaining setting information on setting of the communication condition from outside of the information processing apparatus, and the setting module sets the communication condition for the wireless communication based on the obtained information and the setting information.

In the exemplary embodiment, the information processing apparatus causes the computer to further function as a search module repeatedly searching for another unspecified information processing apparatus within the coverage and automatically establishing wireless connection, and the data communication module may automatically transmit data through wireless communication to another information processing apparatus with which wireless connection has been established and automatically receive data through wireless communication from that another information processing apparatus.

Another exemplary embodiment provides a non-transitory storage medium encoded with a computer readable information processing program executable by a computer of an information processing apparatus having a wireless communication function, causing one or more processors to perform an obtaining module obtaining information on a state of the information processing apparatus or a state of surroundings of the information processing apparatus, a setting module setting a communication condition for wireless communication based on the obtained information, a data reception module receiving data through wireless communication with another information processing apparatus within coverage, and a processing performing module performing prescribed information processing based on the set communication condition and the data received by the data reception module.

In the exemplary embodiment, the processing performing module may extract reception data in accordance with the set communication condition for wireless communication from the reception data received by the data reception module and perform the prescribed information processing based on the extracted reception data.

In the exemplary embodiment, the obtaining module obtains position data representing a position of the information processing apparatus, the data reception module receives the position data through wireless communication with another information processing apparatus within coverage, and the processing performing module may calculate a distance from another information processing apparatus based on the obtained position data representing the position of the information processing apparatus and the received position data of another information processing apparatus and extract, based on a result of calculation, reception data in accordance with the set communication condition for wireless communication from the reception data received by the data reception module.

In the exemplary embodiment, the processing performing module may perform the prescribed information processing based on the position data received by the data reception module from another information processing apparatus.

In the exemplary embodiment, the setting module may set the communication condition for wireless communication for each application.

In the exemplary embodiment, the setting module may set a condition for coverage of the wireless communication as the communication condition, based on the obtained information.

Another exemplary embodiment provides a non-transitory storage medium encoded with a computer readable information processing program executable by a computer of an information processing apparatus having a wireless communication function which has a storage portion storing history information on history of wireless communication with another information processing apparatus, causing one or more processors to perform a setting module setting a communication condition for wireless communication in accordance with the history information stored in the storage portion and a data communication module carrying out at least one of transmission and reception of data through wireless communication with another information processing apparatus within coverage, by using the set communication condition.

An exemplary embodiment provides a method of controlling an information processing apparatus having a wireless communication function, including the steps of obtaining information on a state of the information processing apparatus or surroundings of the information processing apparatus, setting a communication condition for wireless communication based on the obtained information, and carrying out at least one of transmission and reception of data through wireless communication with another information processing apparatus within coverage, by using the set communication condition.

An exemplary embodiment provides an information processing apparatus capable of wireless communication with another information processing apparatus owing to a wireless communication function, including an obtaining module obtaining information on a state of the information processing apparatus or surroundings of the information processing apparatus, a setting module setting a communication condition for wireless communication based on the obtained information, and a data communication module carrying out at least one of transmission and reception of data through wireless communication with another information processing apparatus within coverage by using the set communication condition.

An exemplary embodiment provides an information processing system capable of wireless communication with another information processing apparatus owing to a wireless communication function, including an obtaining module obtaining information on a state of an information processing apparatus or surroundings of the information processing apparatus, a setting module setting a communication condition for wireless communication based on the obtained information, and a data communication module carrying out at least one of transmission and reception of data through wireless communication with another information processing apparatus within coverage by using the set communication condition.

According to the exemplary embodiment, information on a state of an information processing apparatus or surroundings of the information processing apparatus is obtained, and then a condition for wireless communication is set based on the obtained information. Therefore, appropriate wireless communication with another information processing apparatus can be carried out and zest of wireless communication can be enhanced The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 4 shows an exemplary illustrative non-limiting diagram illustrating communication condition setting data in a communication condition setting portion 21 according to the first exemplary embodiment.

FIG. 10 shows an exemplary illustrative non-limiting diagram illustrating communication condition setting data in communication condition setting portion 21 according to a first modification of the first exemplary embodiment.

FIG. 15 shows an exemplary illustrative non-limiting diagram illustrating communication condition setting data in communication condition setting portion 21 according to the second exemplary embodiment.

FIG. 22 shows an exemplary illustrative non-limiting diagram illustrating communication condition setting data according to the first modification of the second exemplary embodiment.

DETAILED DESCRIPTION OF NON-LIMITING EXAMPLE EMBODIMENTS

Figure 1:
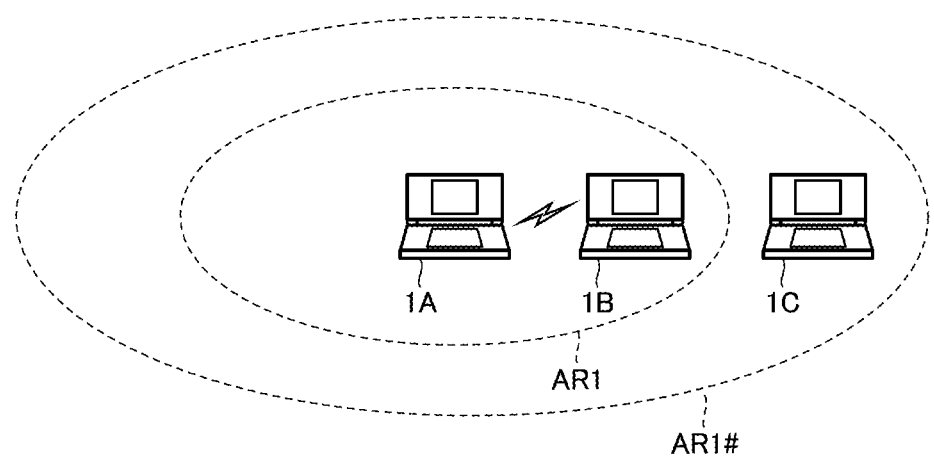
FIG. 1 shows an exemplary illustrative non-limiting diagram schematically showing a configuration of an information processing system according to an exemplary embodiment.

This embodiment will be described in detail with reference to the drawings. It is noted that the same or corresponding parts in the drawings have the same reference characters allotted and description thereof will not be repeated.

FIG. 1 is a diagram schematically showing a configuration of an information processing system based on one embodiment.

Referring to FIG. 1, in the present example by way of example, an information processing system including information processing apparatuses 1A to 1C will be described as one embodiment. Each of information processing apparatuses 1A to 1C has a wireless communication function and can communicate with one another. In the present example, information processing apparatuses 1A to 1C can carry out wireless communication between/among information processing apparatuses included in coverage where communication can be carried out by making use of a wireless communication function.

In the present example, coverage AR1 is shown with information processing apparatus 1A being defined as the reference, and a case where information processing apparatus 1A and information processing apparatus 1B included in coverage AR1 can carry out wireless communication is shown.

When a communication condition for information processing apparatus 1A is changed so as to change coverage AR1 to coverage AR1#, wireless communication can be carried out also between information processing apparatus 1A and information processing apparatus 1C included in coverage AR1#.

In the present example, a case where a communication condition is changed based on information on a state of an information processing apparatus or a state of surroundings of the information processing apparatus is described.

When characteristics common to the information processing apparatuses above are mentioned herein, they may also collectively be referred to as an "information processing apparatus 1." For an information processing apparatus belonging to the information processing system according to the present embodiment, a portable telephone, a smart phone (a high-function portable telephone), a television set incorporating an information processing function, a portable information processing apparatus, a stationary information processing apparatus, and the like can be adopted.

In the present example, a portable game device will be described by way of example of an information processing apparatus.

<Configuration of Game Device>

Figure 2:
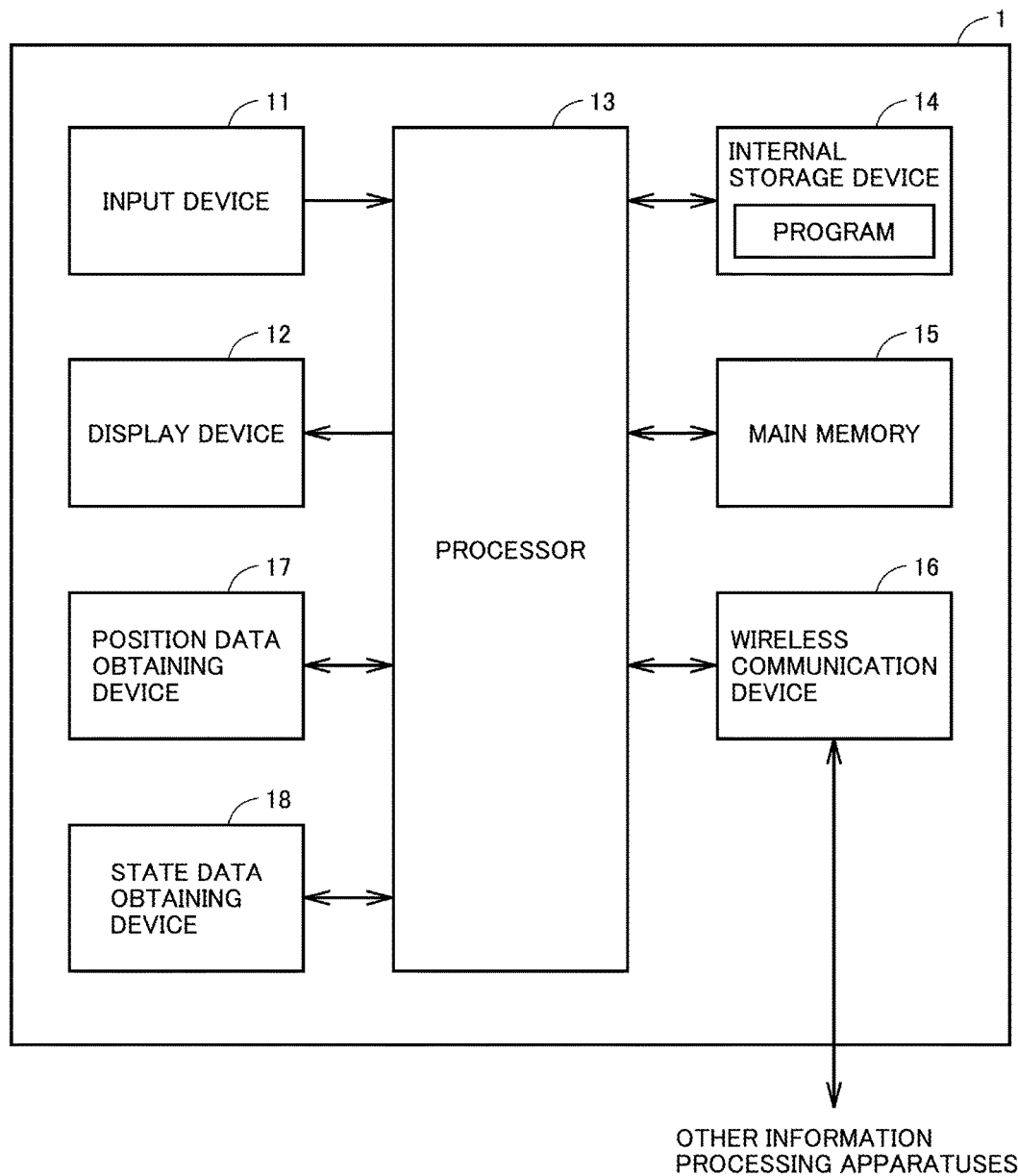
FIG. 2 shows an exemplary illustrative non-limiting schematic block diagram of a configuration of a game device 1 according to the exemplary embodiment.

FIG. 2 is a schematic block diagram of a configuration of a game device 1 based on the present embodiment. Since the configuration is also the same in other game devices, detailed description thereof will not be provided.

Referring to FIG. 2, game device 1 includes an input device 11, a display device 12, a processor 13, an internal storage device 14, a main memory 15, a wireless communication device 16, a position data obtaining device 17, and a state data obtaining device 18.

Input device 11 is operated by a user of game device 1 and outputs to processor 13, a signal in response to a user's operation. Input device 11 is implemented, for example, by a cross-shaped switch, a push button, or a touch panel.

Display device 12 displays on a screen, an image generated in game device 1. Display device 12 can include a liquid crystal display device (LCD) by way of example.

Processor 13 is operation processing means for executing a computer program.

Internal storage device 14 stores a computer program (simply also referred to as a program) to be executed by processor 13. Internal storage device 14 also stores data to be exchanged through communication, which will be described later. Internal storage device 14 is implemented, by way of example, by a NAND-type flash memory. A computer program to be executed by processor 13 may be recorded in advance or may be obtained from another device through communication with another device.

Main memory 15 temporarily stores a computer program or information. Main memory 15 is implemented, by way of example, by a pseudo-SRAM (PSRAM).

Wireless communication device 16 transmits and receives data to and from another game device through wireless communication.

Position data obtaining device 17 can make use of GPS (Global Positioning System) by way of example. Specifically, position data obtaining device 17 has a GPS receiver, receives radio waves from a GPS satellite, and calculates position data (latitude and longitude) by way of example. Then, the calculated position data can be stored as communication data to be transmitted to another game device 1 which will be described later.

State data obtaining device 18 can make use of a microphone capable of receiving input of an audio signal and an acceleration sensor capable of sensing acceleration, by way of example. Specifically, by way of example, state data obtaining device 18 obtains an audio signal input to the microphone as a state of surroundings of game device 1. Position data obtaining device 17 and state data obtaining device 18 are provided as appropriate based on the embodiment below, and they may both be provided, only one of them may be provided, or neither of them can be provided.

The timing when position data obtaining device 17 and state data obtaining device 18 obtain data is not limited to once, and data can be obtained repeatedly and periodically for update. Regarding the timing, a person skilled in the art can design and change an interval as appropriate. In the present embodiment, with updating, a communication condition which will be described later can also dynamically be changed.

First Embodiment

Outline of Wireless Communication

Wireless communication between game devices based on the present first embodiment will be described below.

Wireless communication which is a form of communication between game devices 1 will be described.

In the present embodiment, game device 1 can exchange data for application which can be made use of in a predetermined application program (such as a game application), by using a wireless communication function. By way of example, "wireless communication" in the present embodiment refers to such communication that prescribed data ("position data" in the present first embodiment) stored in internal storage device 14 is directly transmitted automatically (without a user's operation) to another game device 1 present at a short distance and communication data stored in internal storage device 14 of another game device 1 is directly received automatically (without a user's operation) from another game device 1.

More specifically, wireless communication is carried out by cooperation of processor 13, wireless communication device 16, and the like in game device 1. This processing is processing performed as background processing, for example, while game device 1 is in what is called a sleep state (which may also be referred to as a stand-by state). For example, during sleep, such control that wireless communication device 16 basically mainly operates and sleep of processor 13 is temporarily canceled as necessary so that processor 13 temporarily mainly operates is carried out (for example, processing for searching for another game device 1 is performed by wireless communication device 16 and transmission and reception of data is carried out by processor 13). In addition, for example, game device 1 may include, separately from processor 13, a second processor operable with low power consumption, and during sleep, the second processor may mainly operate. Moreover, wireless communication in the present example may be carried out as appropriate during game processing or in response to a user's instruction operation or the like even when game device 1 is not in a sleep state. Wireless communication can also be carried out as background processing during execution of an application.

In wireless communication, for example, game device 1 repeatedly searches for another unspecified game device 1 present within coverage of near field communication. Then, game device 1 establishes communication with another game device 1 which was found as a result of search. Then, game device 1 automatically transmits communication data stored in internal storage device 14 and automatically receives communication data stored in internal storage device 14 of another game device from that another game device.

Wireless communication above is carried out, for example, at the time when users each carrying game device 1 pass each other. It is noted that wireless communication between game devices 1 is also referred to as passing communication in the present example. The position data is generated by position data obtaining device 17 prior to wireless communication without a user's operation and stored in advance in a prescribed area of internal storage device 14.

Figure 3:
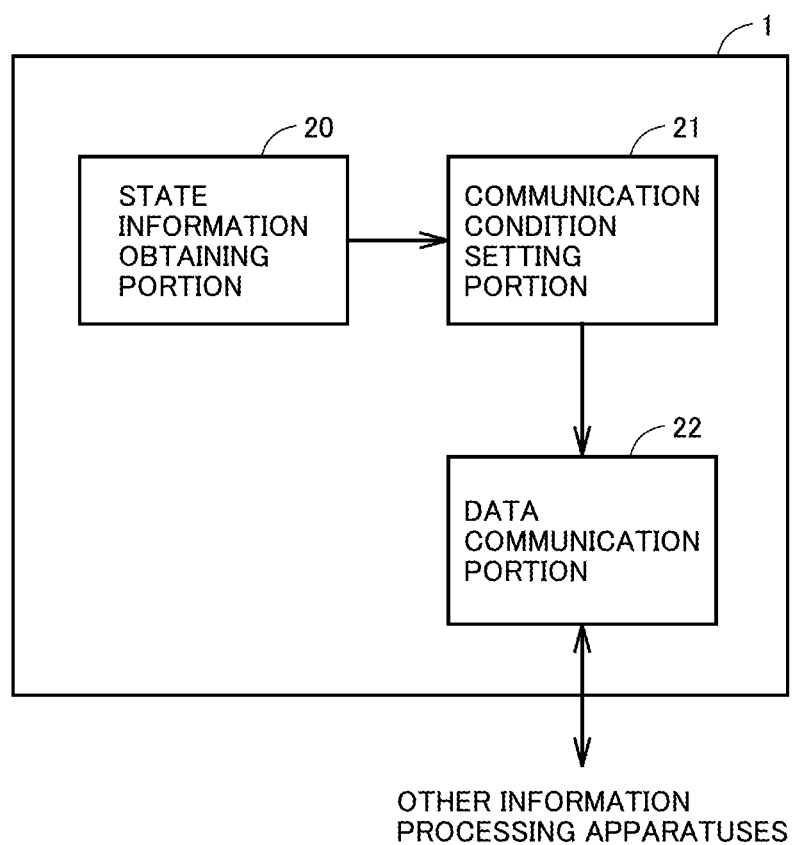
FIG. 3 shows an exemplary illustrative non-limiting diagram illustrating a functional block in a processor 13 of game device 1 according to a first exemplary embodiment.

FIG. 3 is a diagram illustrating a functional block (a module) in processor 13 of game device 1 based on the present first embodiment.

As shown in FIG. 3, game device 1 includes a state information obtaining portion 20, a communication condition setting portion 21, and a data communication portion 22. Each function is implemented by cooperation of processor 13 with position data obtaining device 17, state data obtaining device 18, and wireless communication device 16.

State information obtaining portion 20 obtains state information relating to a state of game device 1 and/or a state of surroundings of game device 1, and outputs the state information to communication condition setting portion 21.

Communication condition setting portion 21 sets a communication condition based on the state information obtained by state information obtaining portion 20. Setting of a communication condition will be described later.

Communication condition setting portion 21 outputs the set communication condition to data communication portion 22.

Data communication portion 22 performs processing for wireless communication with another game device based on the communication condition output from communication condition setting portion 21.

FIG. 4 is a diagram illustrating communication condition setting data in communication condition setting portion 21 based on the present first embodiment.

As shown in FIG. 4, in the present example, by way of example, coverage is set in correspondence with each region. Here, coverage is set for each prefecture.

Specifically, coverage PA1 (reception sensitivity T1, antenna output power P1) is set for a region "Osaka", coverage PA0 (reception sensitivity T0, antenna output power P0) is set for a region "Tokyo", and coverage PA2 (reception sensitivity T2, antenna output power P2) is set for a region "Hokkaido".

In the present example, by way of example, appropriate coverage is set as a communication condition in accordance with a position of game device 1. Specifically, state information obtaining portion 20 of game device 1 obtains position data of game device 1 as a state of game device 1. Communication condition setting portion 21 determines a region where game device 1 is located based on the position data of game device 1. Game device 1 has map data including information on a region such that in which region game device 1 is located can be determined based on position data.

When communication condition setting portion 21 determines that game device 1 is located, for example, in "Osaka" based on the position data of game device 1, it sets coverage PA1 as a communication condition, based on the communication condition setting data. Namely, reception sensitivity T1 and antenna output power P1 are set such that the coverage in wireless communication device 16 is set to coverage PA1. Alternatively, when communication condition setting portion 21 determines that game device 1 is located, for example, in "Hokkaido" based on the position data of game device 1, it sets coverage PA2 as a communication condition based on the communication condition setting data. Namely, reception sensitivity T2 and antenna output power P2 are set such that the coverage in wireless communication device 16 is set to coverage PA2.

Though both of reception sensitivity and antenna output power are set in the present example, any one of them can also be set.

With the processing, for example, a communication condition for narrowing coverage can be set when a region where game device 1 is located is a region where there are many users carrying game devices such as "Osaka", and on the contrary, a communication condition for making coverage broader can be set when a region where game device 1 is located is a region where there are less users such as "Hokkaido". Therefore, appropriate coverage can be set as a communication condition for game device 1 in accordance with communication condition setting data based on position data of a game device.

<Various Types of Data>

Details of processing of an application or the like executed by game device 1 will now be described.

Initially, various types of data used during various types of processing will be described.

Figure 5:
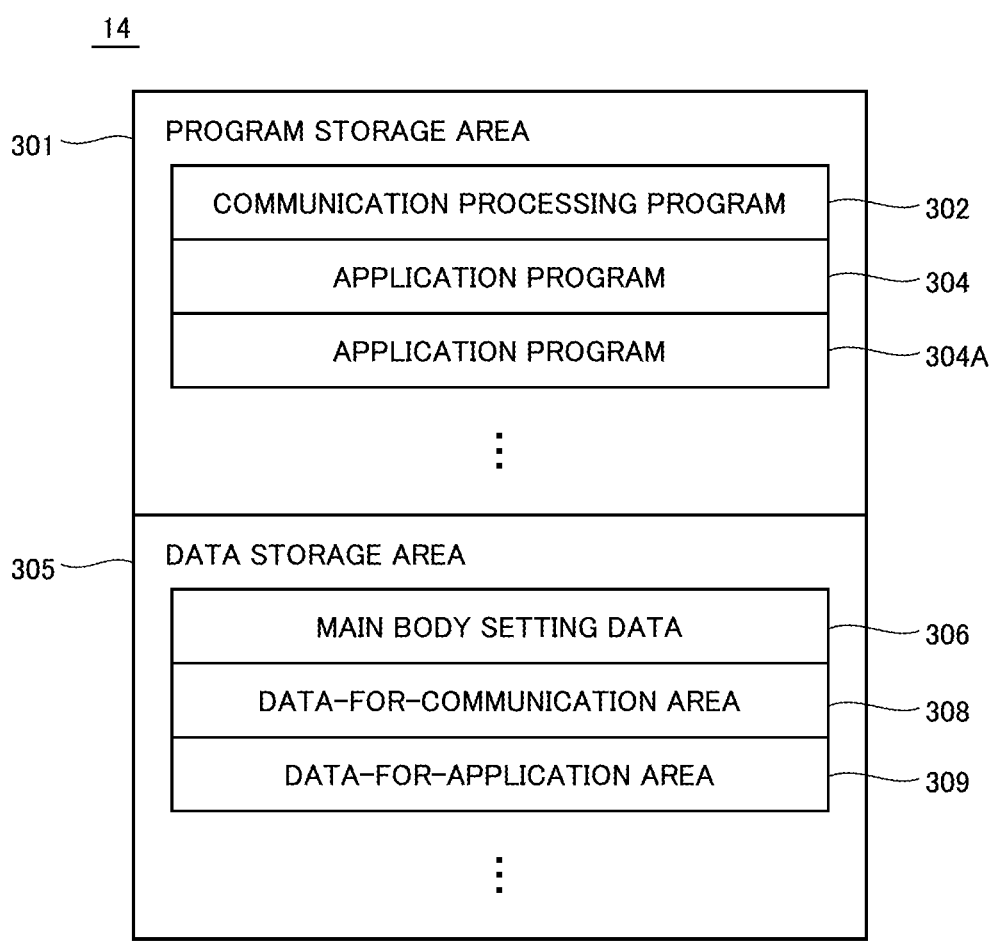
FIG. 5 shows an exemplary illustrative non-limiting diagram showing a memory map of an internal storage device 14 of game device 1 according to the first exemplary embodiment.

FIG. 5 is a diagram showing a memory map of internal storage device 14 of game device 1 based on the present first embodiment.

Referring to FIG. 5, internal storage device 14 includes a program storage area 301 and a data storage area 305. Data in program storage area 301 and data storage area 305 is used as being transferred as appropriate to main memory 15 as necessary during execution of an application.

Program storage area 301 stores various programs to be executed by processor 13. In the present embodiment, a communication processing program 302, an application program 304, 304A, and the like are stored.

Communication processing program 302 is a program for carrying out wireless communication in a sleep mode as described above.

Application programs 304, 304A are programs, for example, for performing game processing and for performing different game processing, and they may together be stored in program storage area 301 or only one of them may be stored therein.

Data storage area 305 stores main body setting data 306, a data-for-communication area 308, and a data-for-application area 309.

Main body setting data 306 is setting data mainly on a main body of game device 1, and includes also a device identification number identifying a device, a MAC address used during communication, and the like.

Data-for-communication area 308 is an area for saving data used for communication. Reception data, transmission data, and the like are saved.

Data-for-application area 309 is an area storing data used in various applications executed by game device 1.

<Communication Data>

Figure 6:
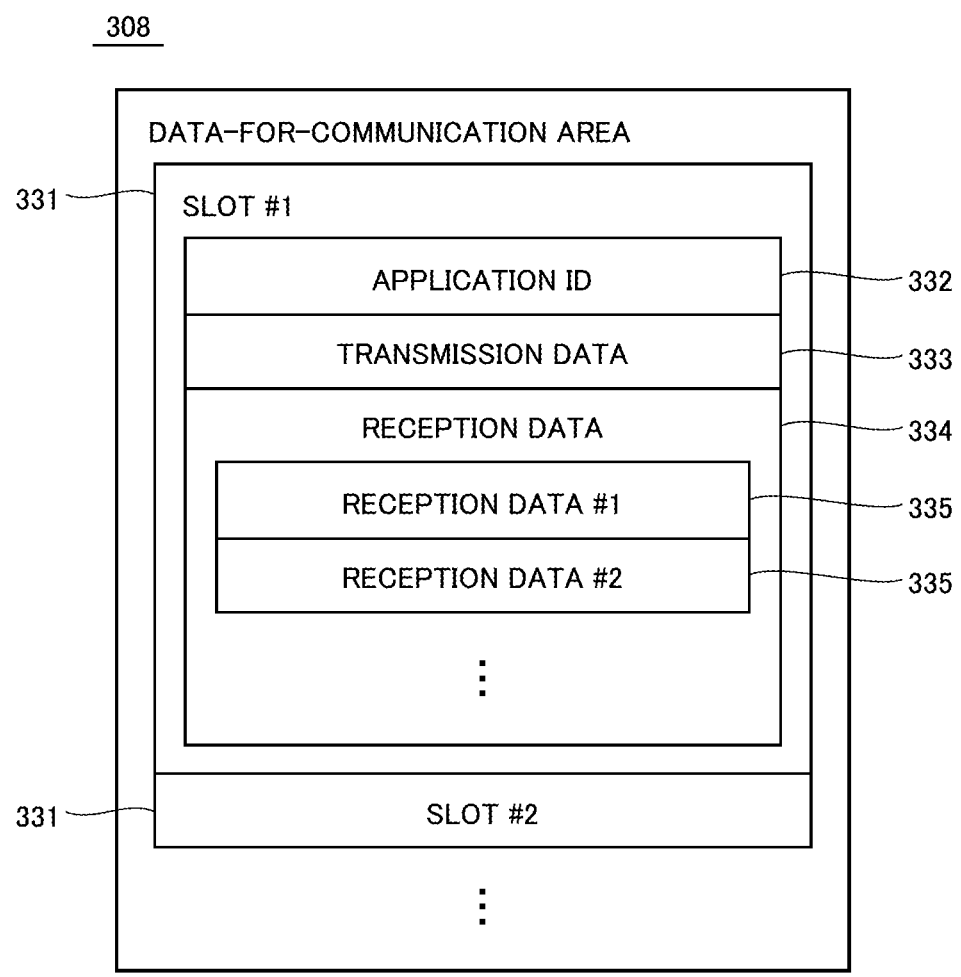
FIG. 6 shows an exemplary illustrative non-limiting diagram showing one example of a configuration of a data-for-communication area 308 according to the first exemplary embodiment.

FIG. 6 is a diagram showing one example of a configuration of data-for-communication area 308 based on the present first embodiment.

Referring to FIG. 6, data-for-communication area 308 includes a plurality of slots 331. Each slot is constituted of an application ID 332, transmission data 333, and reception data 334.

Application ID 332 is an ID for identifying an application using (associated with) the slot.

Transmission data 333 is data to be transmitted to another game device 1 during wireless communication.

Reception data 334 is data received from another game device 1 during wireless communication. Here, a plurality of pieces of reception data 335 similar in configuration to transmission data 333 are stored. Therefore, description of each piece of reception data 335 is not provided.

Though transmission data 333 includes one piece of transmission data in the present example, a plurality of pieces of transmission data can also be included.

For example, a plurality of pieces of transmission data may be included such that contents of transmission data are changed between a case that a reception target is another specific game device (for example, a prescribed another game device registered as a friend for forming a group of friends) and a case that a reception target is a game device other than that. Alternatively, a plurality of pieces of transmission data may be included such that data to be transmitted is changed in accordance with a position of game device 1.

Figure 7:
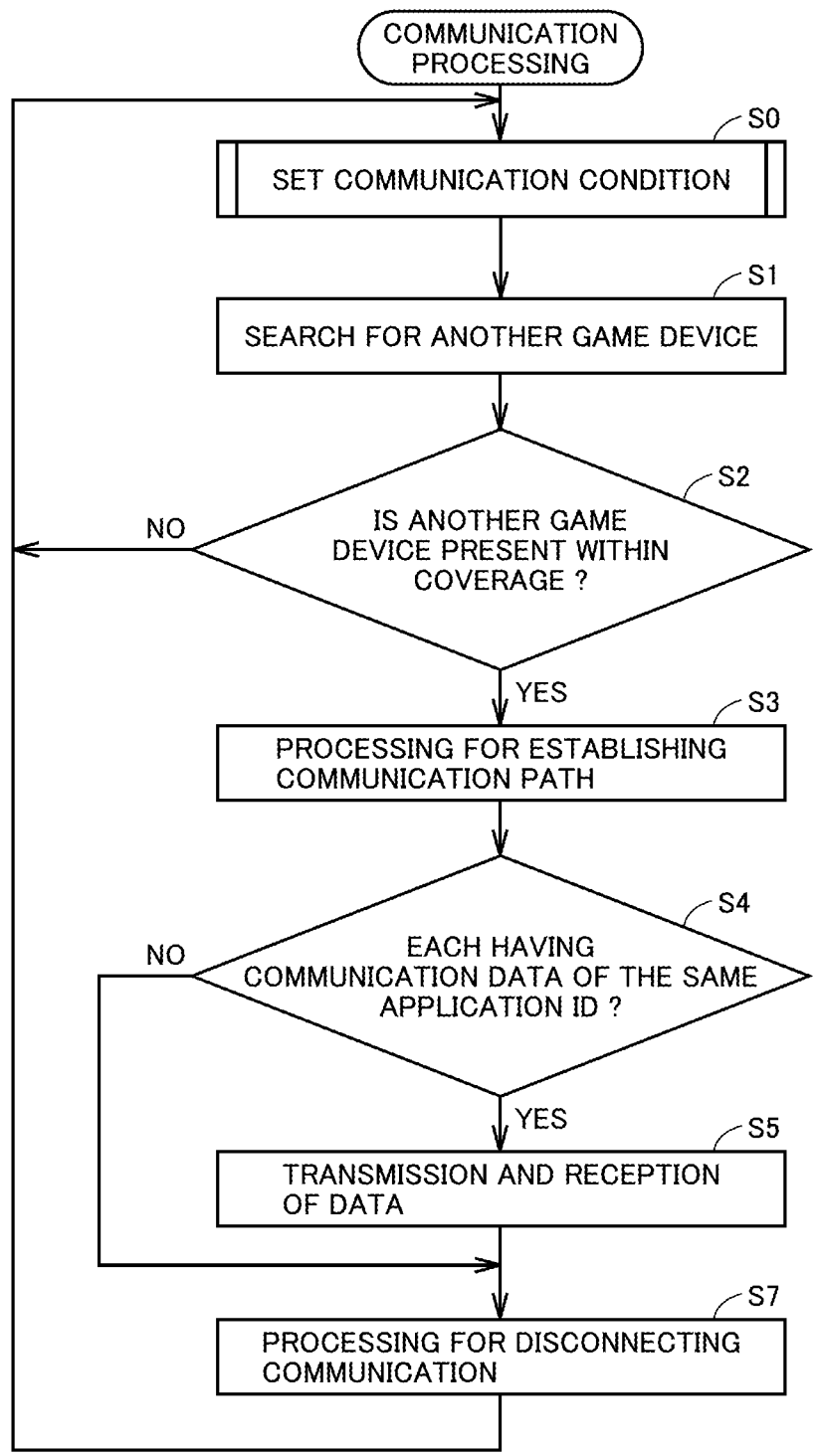
FIG. 7 shows an exemplary illustrative non-limiting flowchart illustrating communication processing according to the first exemplary embodiment.

FIG. 7 is a flowchart illustrating communication processing based on the present first embodiment.

Referring to FIG. 7, the communication processing is performed as processor 13, wireless communication device 16, and the like of game device 1 cooperate. Specifically, it is performed as processor 13 executes communication processing program 302 and cooperates with wireless communication device 16.

This processing is processing performed as background processing, for example, while game device 1 is in what is called a sleep state (which may also be referred to as a stand-by state).

For example, during sleep, such control that wireless communication device 16 basically mainly operates and sleep of processor 13 is temporarily canceled as necessary so that processor 13 temporarily mainly operates is carried out (for example, processing for searching for another game device is performed by wireless communication device 16 and transmission and reception of data is carried out by processor 13). In addition, for example, separately from processor 13, a second processor operable with low power consumption may be provided, and during sleep, the second processor may mainly operate. Moreover, the present processing may be performed as appropriate in response to a user's instruction operation or the like even when a sleep state is not set.

Initially, a communication condition is set (step S0).

Figure 8:
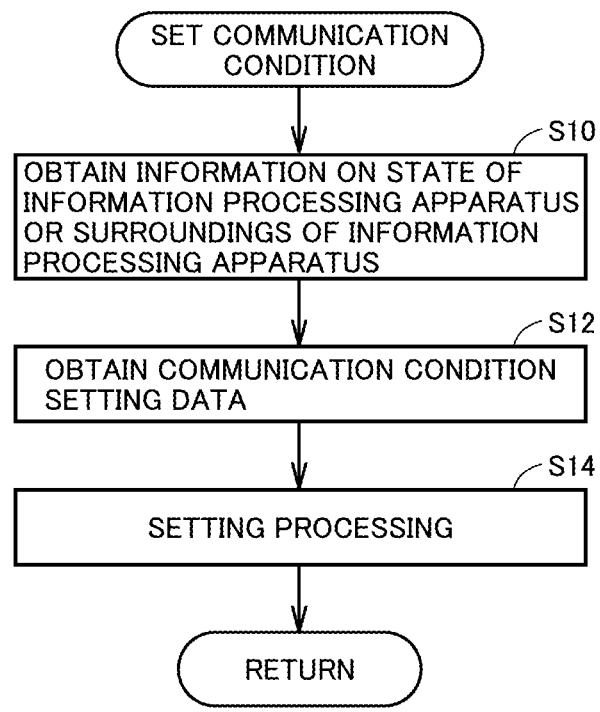
FIG. 8 shows an exemplary illustrative non-limiting flowchart illustrating processing for communication condition setting according to the first exemplary embodiment.

FIG. 8 is a flowchart illustrating processing for communication condition setting based on the present first embodiment.

Referring to FIG. 8, information on a state of an information processing apparatus or surroundings is obtained (step S10). Specifically, processor 13 obtains position data from position data obtaining device 17 or an audio signal from state data obtaining device 18. In the present example, by way of example, position data from position data obtaining device 17 is obtained.

Then, communication condition setting data is obtained (step S12). Specifically, processor 13 obtains communication condition setting data stored in internal storage device 14 described with reference to FIG. 4.

Then, setting processing is performed (step S14). Specifically, processor 13 sets coverage based on the obtained position data and the communication condition setting data.

Then, the process ends (return).

Referring again to FIG. 7, then, processing for searching for another game device 1 in the coverage in accordance with the set communication condition is performed (step S1). This is performed, for example, as each game device 1 repeats processing for transmitting a beacon indicating a connection request and processing for receiving this beacon.

Then, as a result of search, whether or not another game device 1 is present within coverage is determined (step S2). For example, when a response signal to the transmitted beacon is received from another game device 1 within a prescribed time period or when the beacon from another game device 1 is received, affirmative determination is made.

When it is determined in step S2 that another game device 1 is not present within coverage (NO in step S2), the process returns to step S1 and the processing is repeated.

On the other hand, when it is determined in step S2 that another game device 1 is present within coverage (YES in step S2), processing for establishing a communication path for carrying out communication is performed (step S3).

Then, when the communication path has been established, application ID 332 is transmitted and received, and whether or not each has the same application ID 332 is determined (step S4). Namely, whether or not both have prepared communication data for the same game is determined.

When it is determined in step S4 that both have the same application ID 332 (YES in step S4), processing for transmitting transmission data 333 and processing for receiving and storing data sent from another game device as reception data 335 are performed (step S5).

Then, processing for disconnecting communication is performed (step S7). Thereafter, the process returns to step S0, a communication condition is set again, and the processing above is repeated, for example, until a sleep state is canceled.

On the other hand, when it is not determined that both have the same application ID 332 (NO in step S4), the processing in step S5 is skipped and the process proceeds to step S7, where processing for disconnecting communication is performed (step S7). Thereafter, the process returns to step S0, a communication condition is set again, and the processing above is repeated, for example, until a sleep state is canceled. Therefore, when the game is not the same, transmission and reception of communication data is not carried out. In the present example, it is assumed that an application program relating to the same game processing is stored in game device 1 and another game device.

With the processing, by way of example, game device 1 can obtain position data of game device 1 and set appropriate coverage as a communication condition for game device 1 in accordance with the communication condition setting data in accordance with the obtained position data.

<Game Processing>

Figure 9:
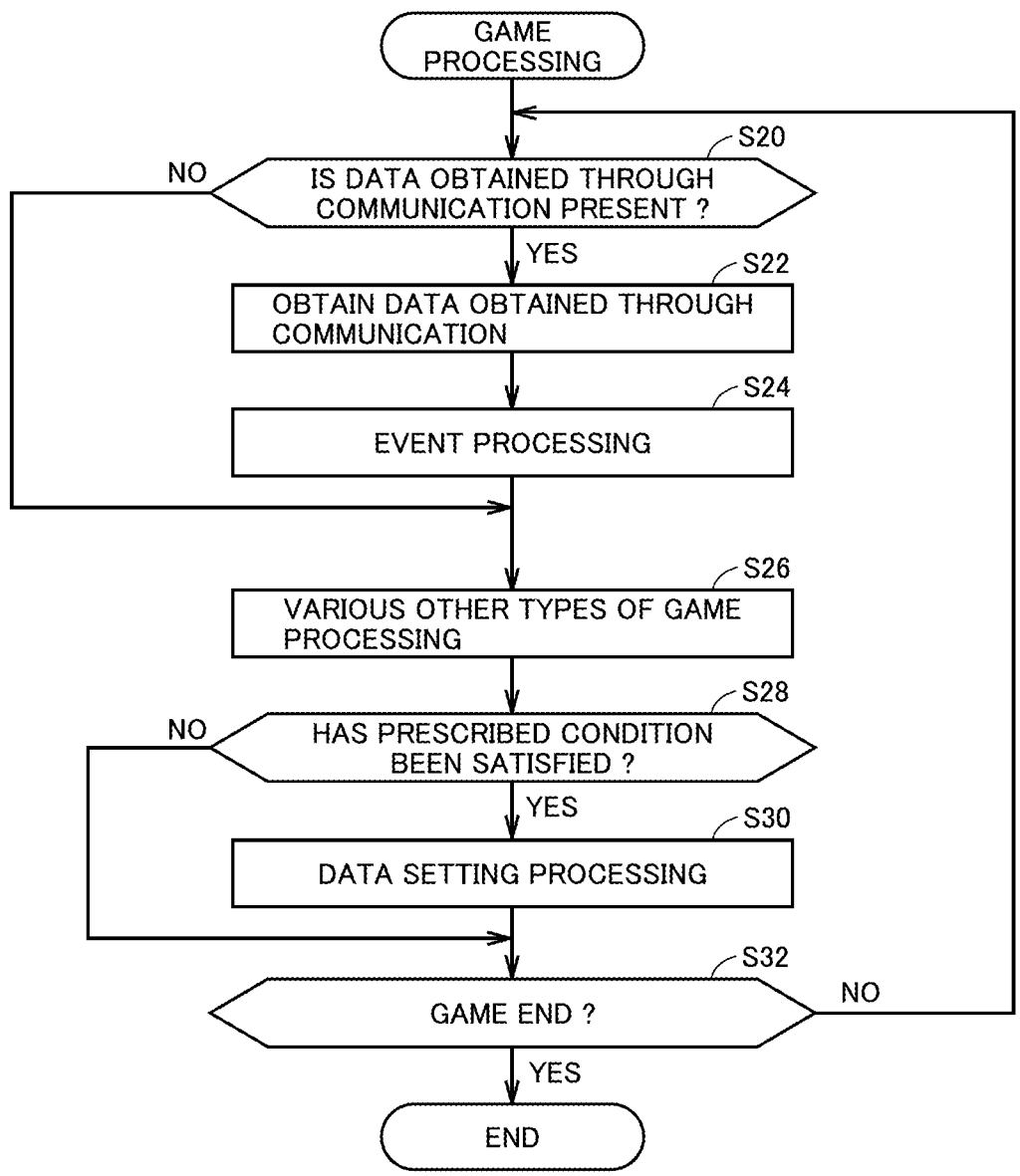
FIG. 9 shows an exemplary illustrative non-limiting flowchart illustrating a flow of game processing in game device 1 according to the first exemplary embodiment.

FIG. 9 is a flowchart illustrating a flow of game processing in game device 1 based on the present first embodiment.

Referring to FIG. 9, the game processing is processing implemented as processor 13 of game device 1 executes application program 304.

Initially, data-for-communication area 308 is referred to, and whether or not new communication data (reception data) received through communication is present in reception data 334 in slot 331 of a corresponding application ID is determined (step S20).

Then, when it is determined in step S20 that newly obtained reception data is present in reception data 334 (YES in step S20), data obtained through communication is obtained (step S22).

Then, event processing based on the obtained data is performed (step S24). For example, display processing making use of obtained data can be exemplified as one example of event processing.

Then, various other types of game processing are performed (step S26).

Then, whether or not data satisfies a prescribed condition during game processing is determined (step S28).

When it is determined in step S28 that a predetermined condition has been satisfied (YES in step S28), data setting processing is performed (step S30). In the present example, when a prescribed operation is performed by way of example, processing for setting transmission data is performed. For example, though details will not be described, character data owned by a user may be stored in transmission data to be transmitted.

When it is determined in step S28 that data does not satisfy a prescribed condition (NO in step S28), step S30 is skipped and whether or not to end a game is determined (step S32). For example, determination can be made based on whether or not a user has instructed end.

When it is determined in step S32 that the game is to end (YES in step S32), the process ends (end).

On the other hand, when it is determined in step S32 that the game is not to end (NO in step S32), the process returns to step S20 and whether or not there is new communication data (reception data) received through communication is determined. Then, the process above is repeated.

With the processing, game processing including event processing of data obtained from within coverage set as the communication condition can be performed. Therefore, when the number of times of communication with a communication counterpart which is another game device is too large or small depending on an environment of the game device, the communication condition can be changed to set appropriate coverage and wireless communication with another game device can be carried out an appropriate number of times. Therefore, zest of wireless communication can be enhanced.

(First Modification)

In the above, a case that a communication condition for wireless communication is set by communication condition setting portion 21 of game device 1 based on position data obtained by state information obtaining portion 20 has been described. State information obtaining portion 20, however, can also obtain other state information without being limited to position data.

(No. 1 Audio Signal)

For example, a communication condition for wireless communication can also be set based on an audio signal obtained by state information obtaining portion 20.

FIG. 10 is a diagram illustrating communication condition setting data in communication condition setting portion 21 based on a first modification of the present first embodiment.

As shown in FIG. 10 (A), in the present example, by way of example, coverage is set in correspondence with a state of people. Here, coverage is set in accordance with crowdedness.

Specifically, in a state of "crowded" as crowdedness, coverage PC0 (reception sensitivity T6, antenna output power P6) is set, and in a state of "less crowded", coverage PC1 (reception sensitivity T7, antenna output power P7) is set.

In the present example, by way of example, appropriate coverage is set as a communication condition based on an audio signal input to game device 1. Specifically, state information obtaining portion 20 of game device 1 obtains an audio signal input as a state of surroundings of game device 1. Communication condition setting portion 21 determines crowdedness in surroundings of game device 1 based on an audio signal input as a state of surroundings of game device 1. Game device 1 has a threshold value for determining crowdedness in the surroundings based on a signal level of an audio signal.

When communication condition setting portion 21 determines, for example, that an audio signal exceeding a threshold value is obtained based on a signal level of an audio signal input to game device 1, it makes determination for crowdedness as "crowded" and sets coverage PC0 as a communication condition. Namely, reception sensitivity T6 and antenna output power P6 are set such that the coverage in wireless communication device 16 is set to coverage PC0. Alternatively, when communication condition setting portion 21 determines, for example, that an audio signal not exceeding the threshold value is obtained based on a signal level of an audio signal input to game device 1, it makes determination for crowdedness as "less crowded" and sets coverage PC1 as a communication condition. Namely, reception sensitivity T7 and antenna output power P7 are set such that the coverage in wireless communication device 16 is set to coverage PC1.

With the processing, for example, when a state of surroundings of game device 1 is determined as crowded, estimation that a region has many users is made and a communication condition for narrowing coverage is set. On the contrary, when determination as less crowded is made as a state of surroundings of game device 1, estimation that a region has less users is made and a communication condition for making coverage broader can be set. Therefore, a communication condition for game device 1 can be set to appropriate coverage in accordance with the communication condition setting data based on an audio signal input to game device 1.

(No. 2 Acceleration Data)

Acceleration data can also be made use of as other state information. Specifically, an acceleration sensor is made use of as state data obtaining device 18.

In the present example, by way of example, state information obtaining portion 20 obtains acceleration data from an acceleration sensor.

As shown in FIG. 10 (B), in the present example, by way of example, coverage is set in correspondence with a state of a game device, that is, a state of operation by a person who carries a game device. Here, coverage is set in accordance with a state of operation by a person.

Specifically, when a state of operation by a person is "stationary", coverage PB0 (reception sensitivity T3, antenna output power P3) is set. In a state of "walking", coverage PB1 (reception sensitivity T4, antenna output power P4) is set. In a state of "running", coverage PB2 (reception sensitivity T5, antenna output power P5) is set.

In the present example, by way of example, appropriate coverage is set as a communication condition based on acceleration data detected by game device 1. Specifically, state information obtaining portion 20 of game device 1 obtains acceleration data detected in response to an operation by a person.

Communication condition setting portion 21 determines a state of operation based on acceleration data detected as a state of operation by a person (a state of game device 1). Game device 1 has each threshold value for determining a state of operation by a person (stationary, walking, running) based on acceleration data. By way of example, a threshold value for distinction between stationary and walking as a state of operation by a person is defined as a first threshold value, and a threshold value for distinction between walking and running is defined as a second threshold value.

When communication condition setting portion 21 determines, for example, that acceleration data exceeding the first threshold value is obtained based on acceleration data detected by game device 1, it makes determination for a state of operation by a person as "walking" and sets coverage PB1 as a communication condition. Namely, reception sensitivity T4 and antenna output power P4 are set such that the coverage in wireless communication device 16 is set to coverage PB1.

Alternatively, when communication condition setting portion 21 determines, for example, that acceleration data not exceeding the first threshold value is obtained based on acceleration data detected by game device 1, it makes determination for a state of operation by a person as "stationary" and sets coverage PB0 as a communication condition. Namely, reception sensitivity T3 and antenna output power P3 are set such that the coverage in wireless communication device 16 is set to coverage PB0.

Alternatively, when communication condition setting portion 21 determines, for example, that acceleration data exceeding the second threshold value is obtained based on acceleration data detected by game device 1, it makes determination for a state of operation by a person as "running" and sets coverage PB2 as a communication condition. Namely, reception sensitivity T5 and antenna output power P5 are set such that the coverage in wireless communication device 16 is set to coverage PB2.

With the processing, for example, when determination as stationary is made for a state of operation by a person (a state of game device 1), estimation that frequency of passing of a user is low is made and a communication condition for making the coverage broader is set. On the contrary, when determination as walking is made for a state of operation by a person (a state of game device 1), estimation that frequency of passing of a user is normal is made and normal coverage can be set as a communication condition. Alternatively, when determination as running is made for a state of operation by a person (a state of game device 1), estimation that frequency of passing of a user is high is made and a communication condition for narrowing the coverage can be set.

Therefore, appropriate coverage can be set as a communication condition for game device 1 in accordance with communication condition setting data based on acceleration data detected by the game device.

A state of operation by a person can also be determined by making use of a motion sensor such as other angular velocity sensor, without being limited to the acceleration sensor.

(No. 3 Position Data and Acceleration Data)

In the above, a case where a communication condition for wireless communication is set based on one piece of state information has been described, however, a communication condition for wireless communication can also be set based on a plurality of pieces of state information.

In the present example, position data and acceleration data are made use of. By way of example, an acceleration sensor is made use of as state data obtaining device 18.

Specifically, state information obtaining portion 20 obtains position data and acceleration data from position data obtaining device 17 and state data obtaining device 18, respectively.

As shown in FIG. 10 (C), in the present example, by way of example, coverage is set in correspondence with position data of a game device and a state of operation by a person who carries the game device (a state of a device). Here, coverage is set for each prefecture and for each state of operation by a person.

Specifically, for the region "Osaka", coverage PA1A is set in a state of "stationary", coverage PA1B is set in a state of "walking", and coverage PA1C is set in a state of "running".

For the region "Tokyo", coverage PA0A is set in a state of "stationary", coverage PA0B is set in a state of "walking", and coverage PA0C is set in a state of "running".

For the region "Hokkaido", coverage PA2A is set in a state of "stationary", coverage PA2B is set in a state of "walking", and coverage PA2C is set in a state of "running".

In the present example, by way of example, appropriate coverage is set as a communication condition based on position data obtained by game device 1 and detected acceleration data. Specifically, state information obtaining portion 20 of game device 1 obtains position data obtained by position data obtaining device 17 and acceleration data detected in response to an operation by a person.

When communication condition setting portion 21 determines, for example, as being located in "Osaka" based on position data, it then determines a state of operation by a person (stationary, walking, running) based on acceleration data.

Game device 1 has each threshold value for distinction between states of operation by a person as described above.

Then, for example, when determination as "stationary" is made for a state of operation by a person based on acceleration data, coverage PA1A is set as a communication condition. Namely, reception sensitivity and antenna output power are set such that coverage in wireless communication device 16 is set to coverage PA1A, which is also the case with other conditions.

With the processing, for example, when a region where game device 1 is located is a region including many users such as "Osaka", a communication condition for narrowing coverage is set. On the contrary, when a region where game device 1 is located is a region including less users such as "Hokkaido", a communication condition for making coverage broader can be set. Furthermore, for example, when determination as stationary is made for a state of operation by a person (a state of game device 1), estimation that frequency of passing of a user is low is made and a communication condition for making coverage broader is again set. When determination as running is made for a state of operation by a person (a state of game device 1), estimation that frequency of passing of a user is high is made and a communication condition for narrowing coverage can again be set.

Therefore, more appropriate coverage can be set as a communication condition for game device 1 in accordance with communication condition setting data based on position data and acceleration data of a game device.

(Second Modification)

In the form above, a case of setting a communication condition by making use of communication condition setting data stored in internal storage device 14 within game device 1 has been described.

When game device 1 is provided to be able to communicate with an external server apparatus 100, the data may be obtained from server apparatus 100. Wireless communication device 16 is provided to be able to communicate with server apparatus 100.

Figure 11:
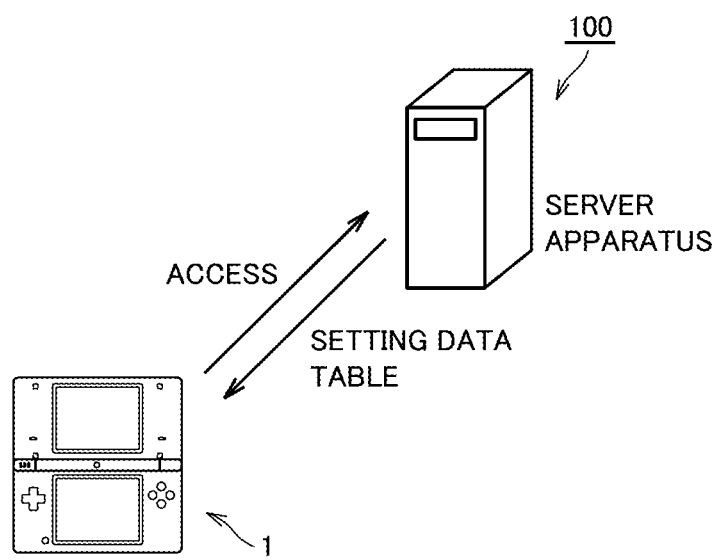
FIG. 11 shows an exemplary illustrative non-limiting diagram illustrating a configuration of an information processing system according to a second modification of the first exemplary embodiment.

FIG. 11 is a diagram illustrating a configuration of an information processing system based on a second modification of the present first embodiment.

As shown in FIG. 11, in the present example, server apparatus 100 provided to be able to communicate with game device 1 is provided.

A setting data table having communication condition setting data stored in a not-shown storage portion provided in server apparatus 100 is obtained by access from game device 1.

According to such a configuration, appropriate coverage can be set as a communication condition for game device 1 in accordance with externally obtained communication condition setting data.

According to such a configuration, server apparatus 100 should only hold a common setting data table and each of a plurality of game devices 1 does not have to hold data. Therefore, a communication condition in an information processing system can readily be changed by changing contents in the setting data table. In addition, a capacity of internal storage device 14 within game device 1 can also be secured.

Second Embodiment

In the above, a communication condition for wireless communication is set by communication condition setting portion 21 based on state information obtained by position data obtaining device 17 and/or state data obtaining device 18 of game device 1. A communication condition for wireless communication may be set based on an internal state of game device 1.

In the present second embodiment, a case that a communication condition for wireless communication is set by communication condition setting portion 21 based on history information of reception data stored in internal storage device 14 as an internal state of game device 1 is described.

Figure 12:
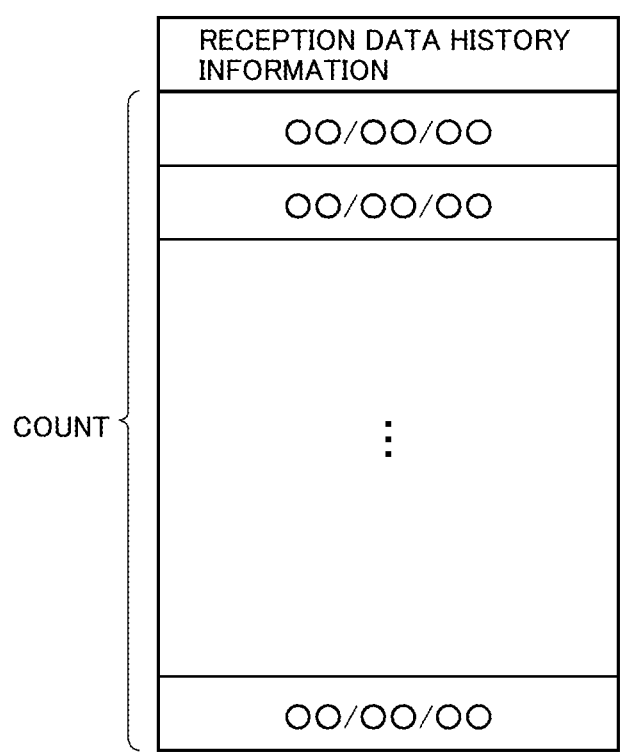
FIG. 12 shows an exemplary illustrative non-limiting diagram illustrating history information of reception data according to a second exemplary embodiment.

FIG. 12 is a diagram illustrating history information of reception data based on the present second embodiment.

Referring to FIG. 12, here, history of a plurality of pieces of reception data is saved. In the present example, by way of example, processor 13 has internal storage device 14 store information on time and date of reception as history information, in connection with reception data received from another game device through wireless communication device 16.

In the present example, by way of example, appropriate coverage is set as a communication condition based on history information of reception data stored in internal storage device 14 of game device 1. Specifically, state information obtaining portion 20 of game device 1 obtains history information of reception data stored in internal storage device 14 of game device 1. Communication condition setting portion 21 determines a communication status of game device 1 based on history information of reception data stored as an internal state of game device 1. Specifically, communication condition setting portion 21 counts the number of times of communication in accordance with reception data received in past three days by way of example, based on history information of reception data. Then, when the number of counts is large, that is, the number of times of communication is large, a communication condition for narrowing coverage is set, and on the contrary, when the number of times of communication is small, a communication condition for making coverage broader is set. As described above, by way of example, reception sensitivity and antenna output power are adjusted as coverage in wireless communication device 16.

Figure 13:
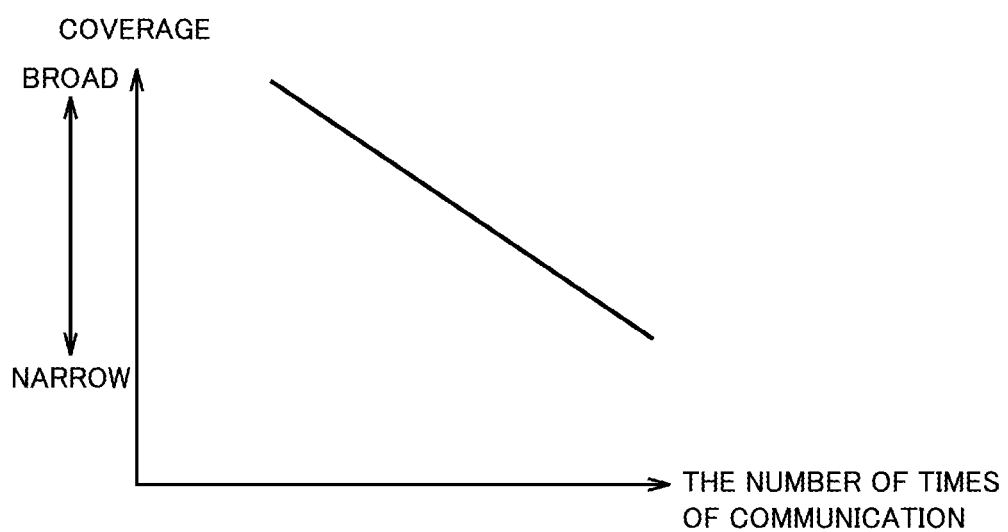
FIG. 13 shows an exemplary illustrative non-limiting diagram illustrating setting of coverage in accordance with the history information of the reception data according to the second exemplary embodiment.

FIG. 13 is a diagram illustrating setting of coverage in accordance with history information of reception data based on the present second embodiment.

Referring to FIG. 13, here, adjustment of coverage in accordance with the number of times of communication is shown, and by way of example, coverage is narrowed when the number of times of communication is large, and coverage is made broader when the number of times of communication is small.

With the processing, for example, when it is determined that the number of times of communication is large as the internal state of game device 1, a communication condition for narrowing coverage can be set, and on the contrary, when it is determined that the number of times of communication is small as the internal state of game device 1, a communication condition for making coverage broader can be set. Therefore, appropriate coverage can be set as a communication condition for game device 1 in accordance with communication condition setting data based on the internal state of game device 1.

Though storage of time and date of reception of reception data as history information of reception data and counting of the number of times of communication in three days have been described in the present example, the number of times of communication in one week may be counted or the number of times of communication in one day may be counted without being limited. Alternatively, an average value of past data may be adopted. Alternatively, without being limited to storage of time and date of reception of reception data as history information, only the number of times of communication when reception data is received may be counted. Alternatively, use as combined with the first embodiment above is also naturally applicable.

Alternatively, a communication condition may be set in accordance with history information of reception data based on the second embodiment in such a situation that position data cannot be obtained, in combination with the first embodiment above.

Third Embodiment

In the present third embodiment, regarding communication data (reception data) wirelessly communicated from another game device, a case that only communication data (reception data) satisfying a set communication condition is made use of in a game device will be described.

Figure 14:
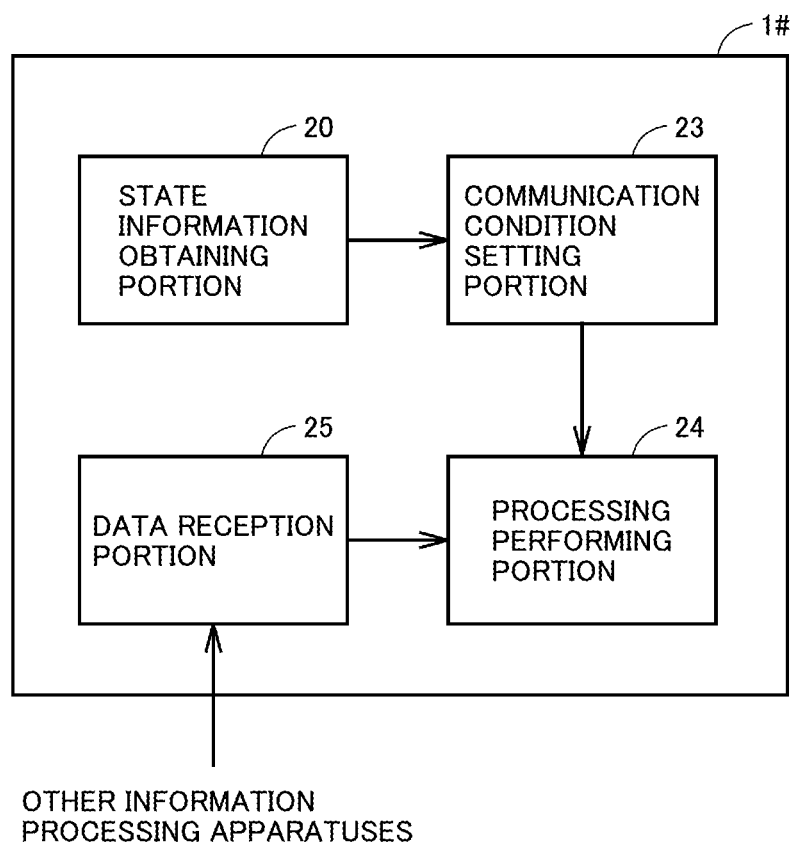
FIG. 14 shows an exemplary illustrative non-limiting diagram illustrating a functional block in processor 13 of a game device 1# according to the second exemplary embodiment.

FIG. 14 is a diagram illustrating a functional block in processor 13 of a game device 1# based on the present third embodiment.

As shown in FIG. 14, game device 1# includes state information obtaining portion 20, a communication condition setting portion 23, a processing performing portion 24, and a data reception portion 25. Each function is implemented as processor 13 cooperates with position data obtaining device 17, state data obtaining device 18, and wireless communication device 16.

State information obtaining portion 20 obtains a state information on a state of game device 1# and/or a state of surroundings of game device 1#, and outputs the state information to communication condition setting portion 23.

Communication condition setting portion 23 sets a communication condition based on state information obtained by state information obtaining portion 20. Setting of a communication condition will be described later.

Communication condition setting portion 23 outputs a set communication condition to processing performing portion 24.

Data reception portion 25 receives communication data from another information processing apparatus and outputs the received communication data to processing performing portion 24.

Processing performing portion 24 performs prescribed processing on the received communication data based on the communication condition output from communication condition setting portion 23. Specifically, by way of example, only reception data compatible with the communication condition is extracted and the extracted reception data is subjected to event processing. In processing performing portion 24, reception data which is not extracted is not made use of for event processing. Reception data which is not made use of may be deleted.

FIG. 15 is a diagram illustrating communication condition setting data in communication condition setting portion 23 based on the present third embodiment.

As shown in FIG. 15, in the present example, by way of example, coverage is set in correspondence with each region. Here, coverage is set for each prefecture.

Specifically, coverage PD1 (distance D1) is set for the region "Osaka", coverage PD0 (distance D0) is set for the region "Tokyo", and coverage PD2 (distance D2) is set for the region "Hokkaido".

In the present example, by way of example, appropriate coverage is set as a communication condition in accordance with a position of game device 1#. Specifically, state information obtaining portion 20 of game device 1# obtains position data of game device 1# as a state of game device 1#. Communication condition setting portion 23 determines a region where game device 1# is located based on position data of game device 1#. Game device 1# has map data including information on a region such that in which region game device 1# is located can be determined based on position data.

When communication condition setting portion 23 determines that game device 1# is located, for example, in the region "Osaka" based on position data of game device 1#, it sets coverage PD1 (distance D1) as a communication condition based on the communication condition setting data. Then, the set communication condition is output to processing performing portion 24.

Data reception portion 25 receives communication data (reception data) wirelessly communicated from another game device (another information processing apparatus) and outputs the reception data to processing performing portion 24.

In the present example, the communication data (reception data) wirelessly communicated from another game device includes, by way of example, position data of another game device. For example, position data is obtained by state information obtaining portion 20 in another game device.

Processing performing portion 24 calculates a communication distance based on position data included in communication data (reception data) and position data of game device 1#. Then, whether or not the calculated communication distance is within coverage PD1, that is, within distance D1, is determined. When it is determined that the communication data (reception data) is reception data from another game device within coverage PD1 based on the result of calculation, the communication data (reception data) is extracted. Then, event processing based on the extracted communication data (reception data) is performed.

When it is determined that the communication data (reception data) is communication data (reception data) from another game device at a position out of coverage PD1, that is, at a distance greater than distance D1, the communication data (reception data) is not extracted. Therefore, the communication data (reception data) is not made use of for event processing.

With the processing, for example, a communication condition (a distance) for narrowing coverage is set when a region where game device 1# is located is a region where there are many users such as the region "Osaka". On the contrary, a communication condition (a distance) for making coverage broader is set when a region where game device 1# is located is a region where there are less users such as the region "Hokkaido". Then, game device 1# extracts only communication data compatible with the communication condition and then makes use of the communication data. Namely, the number of pieces of extracted communication data can be adjusted. Therefore, appropriate coverage can be set as a communication condition for game device 1# in accordance with communication condition setting data based on position data of game device 1#.

Figure 16:
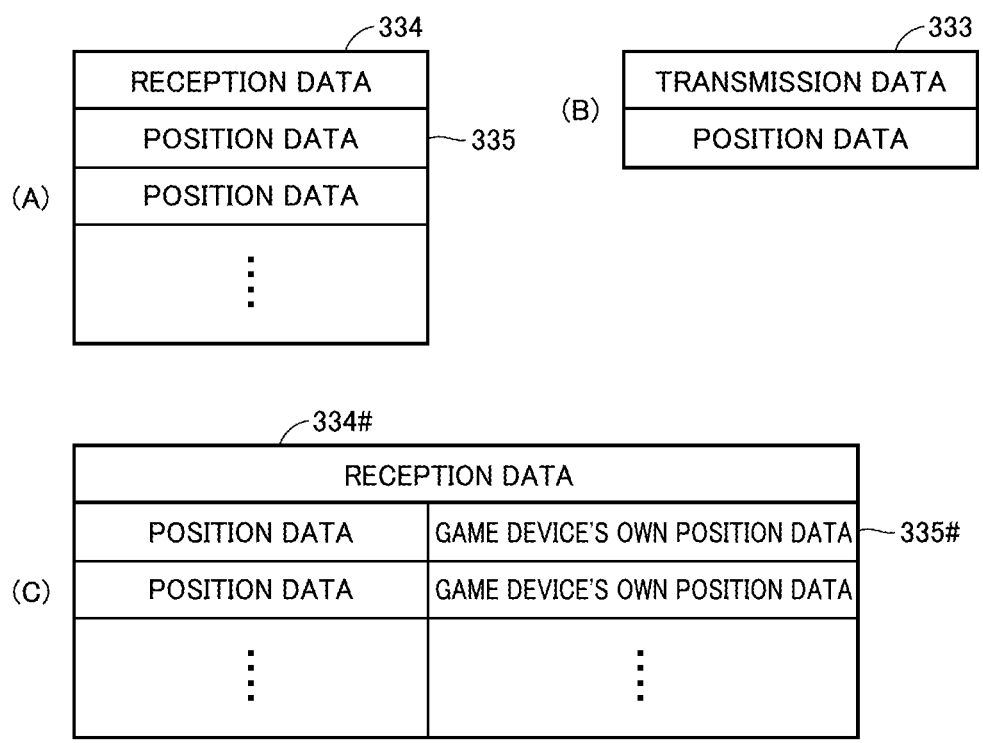
FIG. 16 shows an exemplary illustrative non-limiting diagram illustrating one example of communication data stored in a data-for-communication area according to the second exemplary embodiment.

FIG. 16 is a diagram illustrating one example of communication data stored in a data-for-communication area based on the present third embodiment.

Referring to FIG. 16 (A), here, a specific example of reception data 334 received through passing communication is shown. Specifically, position data received through communication with another game device is stored as reception data 335.

Referring to FIG. 16 (B), here, a specific example of transmission data 333 to be transmitted through passing communication is shown. Specifically, position data to be transmitted through communication with another game device is stored as transmission data 333. The position data is obtained by position data obtaining device 17 of game device 1#. Regarding the position data stored as transmission data 333, position data obtained by position data obtaining device 17 at the time of transmission of that communication data may be stored, or position data obtained by position data obtaining device 17 may overwrite and update transmission data 333 every prescribed period.

Referring to FIG. 16 (C), here, a specific example of reception data received through passing communication different from that in FIG. 16 (A) is shown. Specifically, received position data and position data of game device 1# obtained by position data obtaining device 17 at the time of that reception (game device's own position data) are stored as reception data 335# in association with each other. As such, position data of game device 1# at the time of communication (the time point of exchange of communication data (the time point of exchange)) can be set in association. Thus, relative positional relation between game devices at the time point of exchange can be calculated. Position data obtained by position data obtaining device 17 at the time of reception of position data from another game device may be stored in association or position data of game device 1# stored as transmission data may be stored as communication data in association.

<Game Processing>

Figure 17:
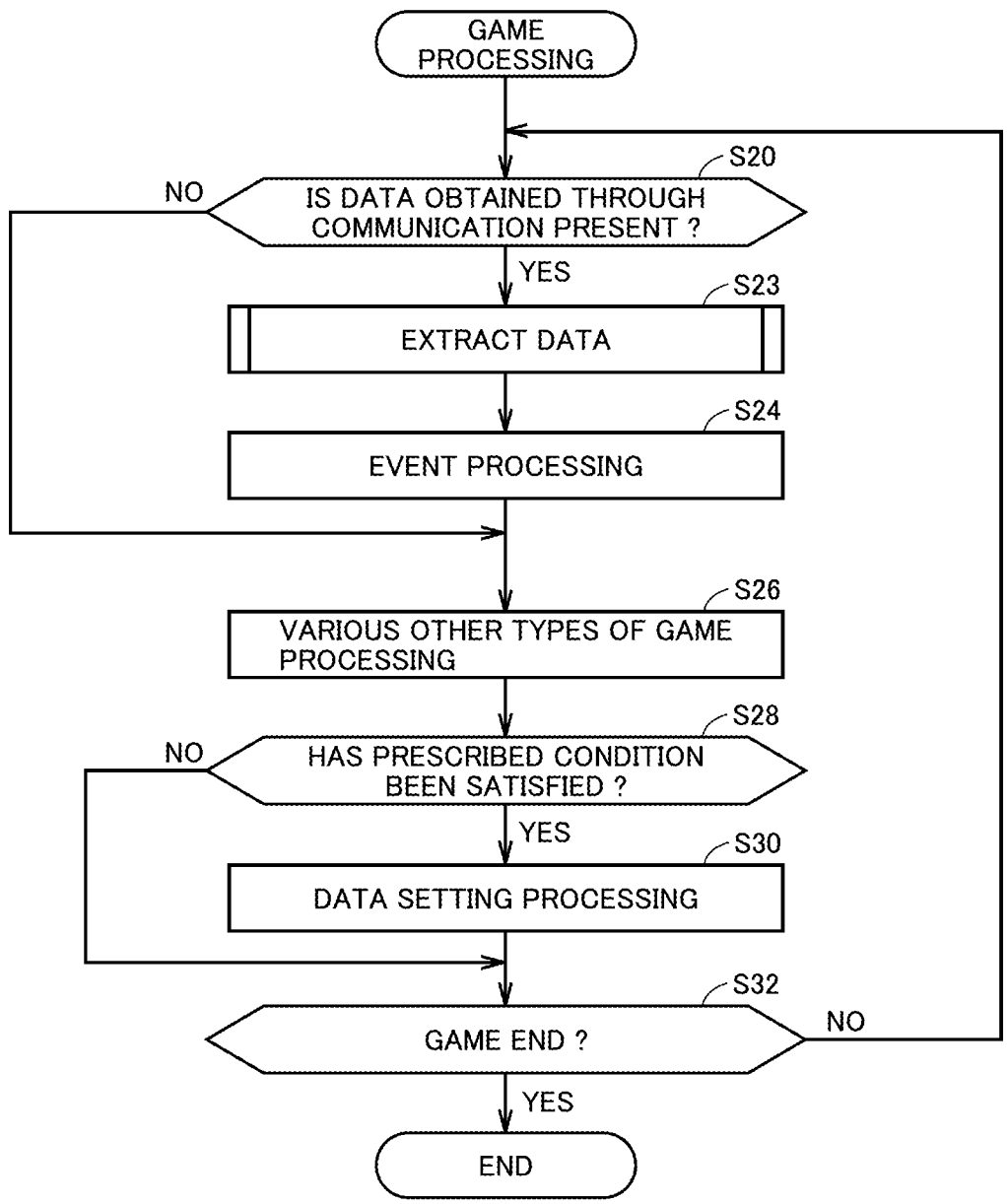
FIG. 17 shows an exemplary illustrative non-limiting flowchart illustrating a flow of game processing in game device 1# according to the second exemplary embodiment.

FIG. 17 is a flowchart illustrating a flow of game processing in game device 1# based on the present third embodiment.

Referring to FIG. 17, the game processing is implemented as processor 13 of game device 1# executes application program 304A by way of example.

The processing is different from the game processing described with reference to FIG. 9 in that step S22 has been replaced with step S23. Since the processing is otherwise the same as described with reference to FIG. 9, detailed description thereof will not be repeated.

Initially, data-for-communication area 308 is referred to, and whether or not new communication data (reception data) received through communication is present in slot 331 of a corresponding application ID is determined (step S20).

Then, when it is determined in step S20 that newly obtained reception data is present in reception data 334 (YES in step S20), processing for extracting data (data extraction processing) is performed (step S23).

Figure 18:
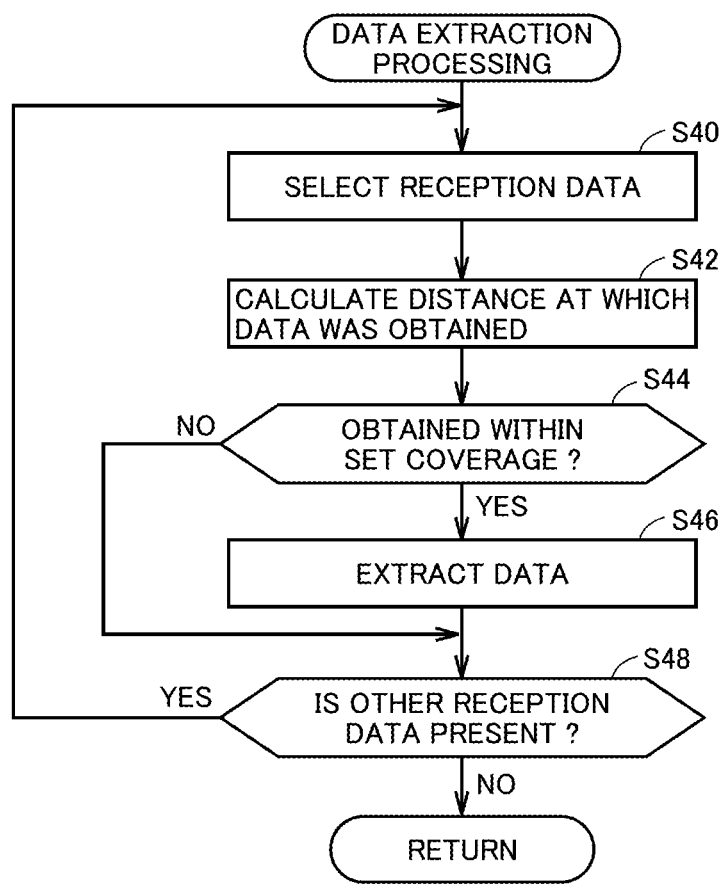
FIG. 18 shows an exemplary illustrative non-limiting flowchart illustrating data extraction processing in game device 1# according to the second exemplary embodiment.

FIG. 18 is a flowchart illustrating data extraction processing in game device 1# based on the present third embodiment.

As shown in FIG. 18, initially, reception data is selected (step S40). Newly obtained reception data is selected from reception data 334.

Then, a distance at which the selected reception data has been obtained is calculated (step S42). Specifically, a distance is calculated based on position data of another game device included in the reception data and position data of game device 1#. The position data of game device 1# is obtained from position data obtaining device 17 by way of example.

Then, whether or not the selected reception data has been obtained within the set coverage is determined (step S44). Specifically, whether or not the calculated distance is within the set coverage is determined.

When it is determined in step S44 that the selected reception data has been obtained within the set coverage (YES in step S44), data is extracted (step S46). Specifically, when it is determined that the calculated distance is within the set coverage, the reception data is extracted.

Then, whether or not there is other reception data in reception data 334 is determined (step S48).

When it is determined in step S48 that there is other reception data in reception data 334 (YES in step S48), the process returns to step S40 and the processing above is repeated for other reception data.

When it is determined that there is no other reception data in reception data 334 (NO in step S48), the process ends (return).

When it is determined in step S44 that the selected reception data has not been obtained within the set coverage (NO in step S44), step S46 is skipped and the process proceeds to step S48. Other processing is the same.

Referring again to FIG. 17, the extracted communication data (reception data) is subjected to event processing (step S24). For example, display processing making use of obtained data can be exemplified as one example of event processing.

Figure 19:
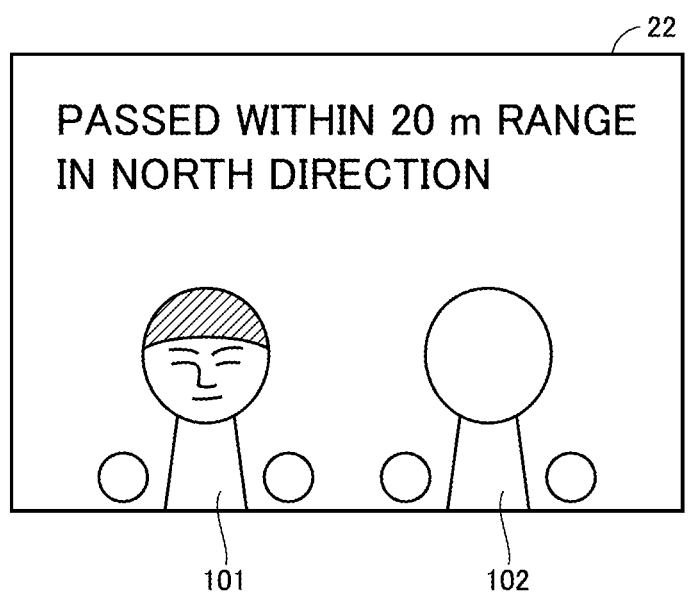
FIG. 19 shows an exemplary illustrative non-limiting diagram illustrating event processing according to the second exemplary embodiment.

FIG. 19 is a diagram illustrating event processing based on the present third embodiment.

Referring to FIG. 19, here, display processing based on position data is shown. Specifically, relative positional relation between game devices which have carried out exchange is displayed in a message, based on position data received from another game device corresponding to another character 102, together with a character 101 corresponding to game device 1#.

Specifically, a message "passed within 20-m range in north direction" is displayed. The message shows that when position data is exchanged between game device 1# and another game device, the location of exchange is such that, based on comparison of position data at the time of exchange, another game device was located in the north of the position of game device 1# and the distance therebetween was within a 20-m range, and data was exchanged at the time of passing at that location.

By displaying a situation of communication (relative positional relation) in a message, a user can readily grasp information on a situation of communication and zest of data communication can further be enhanced. Though display in a message of both of a direction and a distance representing relative positional relation to each other has been described in the present example, any one of them may be displayed in a message without being limited, which is also the case as below.

Figure 20:
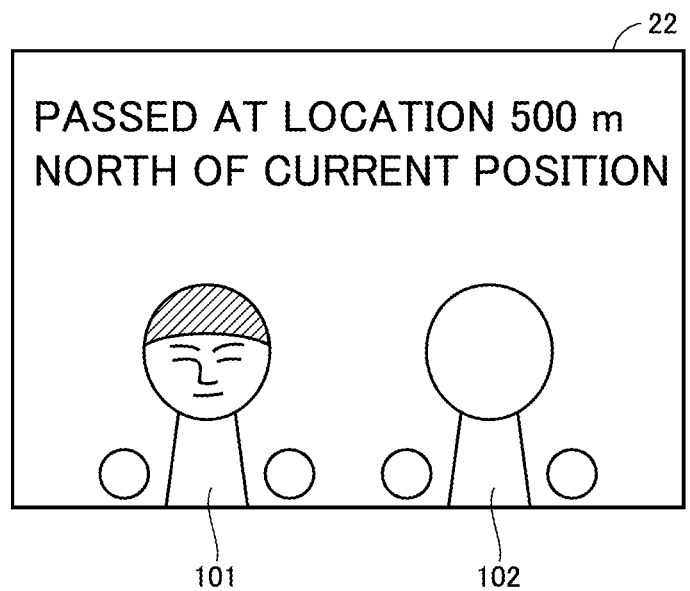
FIG. 20 shows an exemplary illustrative non-limiting diagram illustrating another example of event processing according to the second exemplary embodiment.

FIG. 20 is a diagram illustrating another example of event processing in the present third embodiment.

Referring to FIG. 20, here, other display processing based on position data is shown. Specifically, relative positional relation between game devices which have carried out exchange is displayed in a message, based on position data received from another game device corresponding to another character 102, together with character 101 corresponding to game device 1#.

Specifically, a message "passed at location 500 m north of current position" is displayed. The message shows that when position data is exchanged between game device 1# and another game device, based on comparison with current position data of game device 1#, the location of exchange was distant from current game device 1# by 500 m in the north direction, and data was exchanged at the time of passing of another game device at that location.

By displaying a situation in which communication was carried out (relative positional relation) in a message, a user can readily grasp information on a situation of communication and zest of data communication can further be enhanced.

With the processing, game processing including event processing of data obtained from within coverage set as a communication condition can be performed. Therefore, when the number of times of communication with a communication counterpart which is another game device is too large or small depending on an environment of the game device, a communication condition can be changed to set appropriate coverage and wireless communication with another game device can be carried out an appropriate number of times. Therefore, zest of wireless communication can be enhanced.

(First Modification)

In the above, a communication condition for wireless communication is set by communication condition setting portion 23 of game device 1#, based on position data obtained by state information obtaining portion 20. State information obtaining portion 20, however, can also obtain other state information without limited to position data so as to set a communication condition for wireless communication.

In the present first modification, a case that information on an application executed by game device 1# is obtained as a state of game device 1# and a communication condition for wireless communication is set for each application is described.

Figure 21:
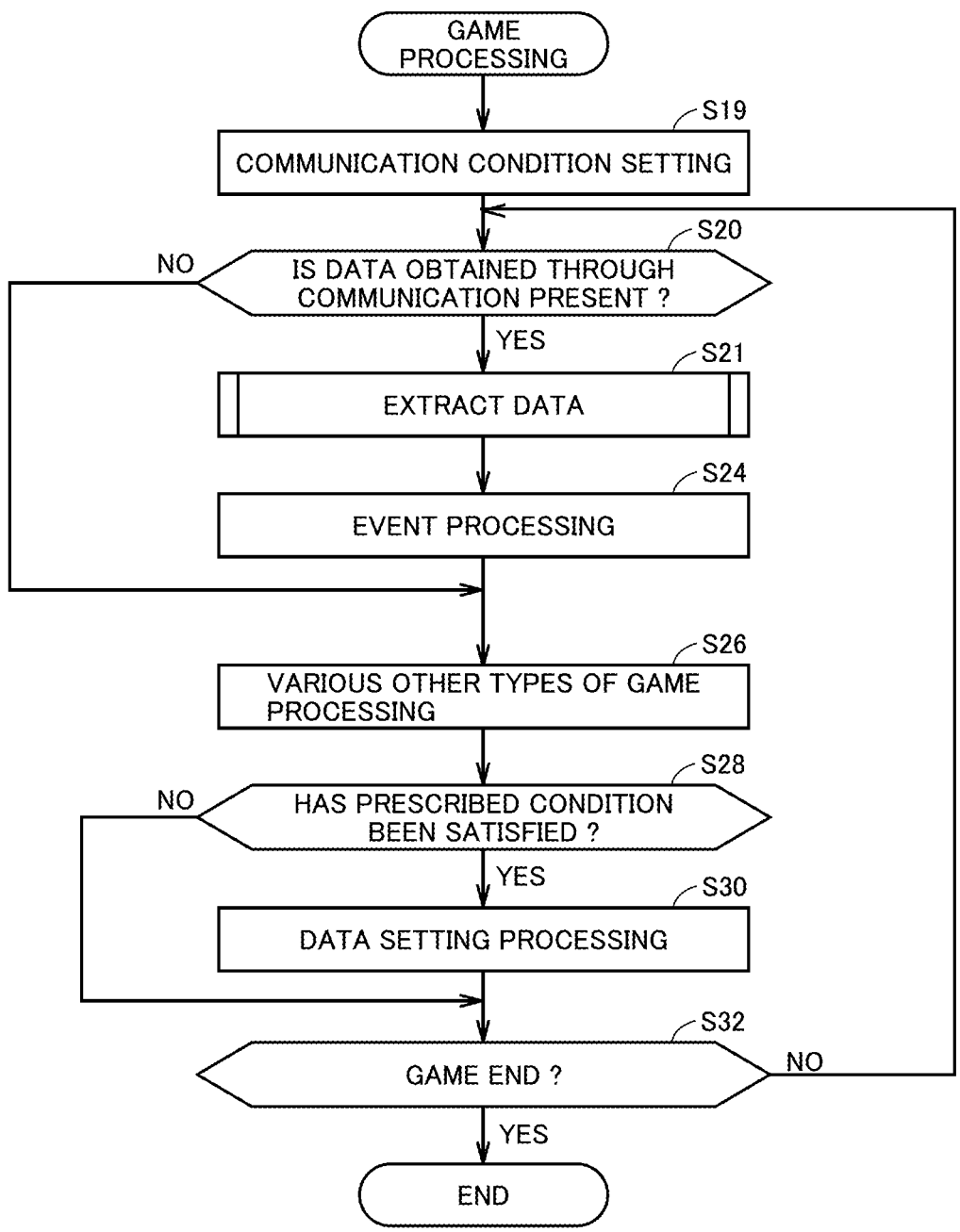
FIG. 21 shows an exemplary illustrative non-limiting flowchart illustrating a flow of game processing in game device 1# according to a first modification of the second exemplary embodiment.

FIG. 21 is a flowchart illustrating a flow of game processing in game device 1# based on a first modification of the present third embodiment.

Referring to FIG. 21, the processing is different from the game processing described with reference to FIG. 17 in additional step S19. Since the processing is otherwise the same as described with reference to FIG. 17, detailed description thereof will not be repeated.

Initially, processing for setting a communication condition is performed (step S19).

FIG. 22 is a diagram illustrating communication condition setting data based on the first modification of the present third embodiment.

As shown in FIG. 22, in the present example, by way of example, coverage is set in correspondence with each application.

Specifically, coverage PE1 (a distance D3) is set for an application name "application A", coverage PE2 (a distance D4) is set for an application name "application B", and coverage PE3 (a distance D5) is set for an application name "application C".

In the present example, by way of example, appropriate coverage is set as a communication condition for game device 1# for each application. Specifically, state information obtaining portion 20 of game device 1# obtains as a state of game device 1#, information on an application executed by game device 1#.

Communication condition setting portion 23 sets coverage based on the communication condition setting data in accordance with an application name executed by game device 1#. Specifically, communication condition setting portion 23 sets coverage PE1 (distance D3) in accordance with the application name "application A". By way of example, the set communication condition is output to processing performing portion 24 such that the coverage is set to coverage PE1 (distance D3).

Data reception portion 25 receives communication data (reception data) wirelessly communicated from another information processing apparatus and outputs the reception data to processing performing portion 24.

In the present example, communication data (reception data) wirelessly communicated from another game device includes position data of another game device by way of example. For example, state information obtaining portion 20 in another game device obtains the position data.

Processing performing portion 24 calculates a communication distance based on position data included in the communication data (reception data) and position data of game device 1#. Then, whether or not the calculated communication distance is within coverage PE1, that is, within distance D3, is determined. When it is determined that the communication data (reception data) is reception data from another game device within coverage PE1 based on the result of calculation, the communication data (reception data) is extracted. Then, event processing based on the extracted communication data (reception data) is performed.

When it is determined that the communication data (reception data) is communication data (reception data) from another game device at a position out of coverage PE1, that is, at a distance greater than distance D3, the communication data (reception data) is not extracted. Therefore, the communication data (reception data) is not made use of for event processing.

With the processing, coverage of game device 1# can be set, for example, for each application. Therefore, a communication condition (a distance) is set depending on the number of users who use an application or a condition of use. Then, game device 1# extracts only communication data compatible with the communication condition and makes use of the extracted communication data. Therefore, appropriate coverage can be set as a communication condition for game device 1# in accordance with communication condition setting data based on an application executed by game device 1#, and zest of wireless communication can be enhanced with coverage in accordance with the application being set.

Though whether or not a distance based on position data is within a prescribed range is set as coverage for each application in the present example, coverage may be set in combination with a region where game device 1# is located.

Other Embodiments

Though GPS is made use of as position data obtaining device 17 in the embodiments above, position data can also be obtained based on other schemes, without being particularly limited to GPS.

By way of example, an access point where wireless communication with a game device can be carried out may be provided so as to carry out wireless communication with the access point and to obtain position data. This position data is information representing a position where an access point is set, and made use of as information representing a general current position of the game device and other game devices. Position data includes, for example, information representing a latitude and a longitude of the access point, information representing an address of the access point, and image data of a map of an area around a position of the access point, however, any information is applicable so long as the information represents a position of the access point without being limited to those as listed. Alternatively, position data may be obtained from a device of which position can be located by communicating with the same, without being limited to obtaining a position from an access point. In this connection, position data may be obtained from another game device.

The processing described above may be performed based on position data input by a user who inputs position data such as a name of a region.

Thus, position data can externally be obtained without providing position data obtaining device 17 based on GPS in a game device.

Alternatively, rather than obtaining position data from a single access point, a plurality of access points can further be provided to obtain position data of a game device based on relation between the plurality of access points and intensity of radio waves. In the present example, by way of example, position data is obtained from adjacent access points. When position data from a plurality of adjacent access points is received, for example, by way of example, position data from an access point high in radio wave intensity can be prioritized.

Game device 1 in the present example may obtain position data by making use of sound waves, without being limited to radio waves. Alternatively, position data can also be obtained by estimating position data of game device 1 by using an acceleration sensor, an angular velocity sensor, or an earth magnetic field sensor provided in game device 1.

Though a plurality of types of processing is performed by one game device (game device 1) in the embodiments above, the plurality of types of processing may be performed by a plurality of game devices (such as game device 1 and a server apparatus) as distributed in other embodiments.

For example, in the third embodiment above, a plurality of types of processing shown in FIG. 21 may be performed by one computer (processor 13) or performed as distributed to a plurality of computers making use of a server apparatus. Through the processing, for example, processing heavy in processing load is performed by a server apparatus for distribution of processing. Thus, high-speed information processing can be realized. Similarly also in other first and second embodiments, information processing making use of a server apparatus can also be performed.

An application executable by a personal computer may be provided as a program in the present embodiment. A read only memory (ROM) or a storage device in which a program and various types of data are computer (or CPU)-readably recorded (which is referred to as a "recording medium") or a random access memory (RAM) developing a program may be provided. A "non-transitory tangible medium" such as a tape, a disc, a card, a semiconductor memory, or a programmable logic circuit can be employed as the recording medium. The program may be supplied to the computer through any transmission medium which can transmit the program (a communication network or broadcast waves). The present embodiment may be realized also in a form of a data signal embedded in carrier waves, in which the program is embodied by electronic transmission.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims. The word "comprising" does not exclude the presence of elements or steps other than those listed in a claim. The word "a" or "an" preceding an element does not exclude the presence of a plurality of such elements.

What is claimed is:

1. A non-transitory computer readable storage medium encoded with an information processing program, which, when executed by a computer of a portable information processing terminal having a wireless communication function, causes one or more processors of the computer to perform operations comprising:
   obtaining information on a state of said portable information processing terminal or a state of surroundings of said portable information processing terminal;
   setting a communication condition for wireless communication based on obtained said information;
   receiving data through wireless communication with another portable information processing terminal within coverage;
   when the data is received from said another portable information processing terminal within a predetermined distance, extracting reception data from the received data in accordance with the set communication condition, and performing prescribed information processing based on the extracted reception data; and
   when the data is received from said another portable information processing terminal outside the predetermined distance, not extracting reception data from the received data, and not performing the prescribed information processing.

2. The non-transitory storage medium according to claim 1, wherein the one or more processors are further configured to:
obtain position data representing a position of said portable information processing terminal,
receive the position data through wireless communication with another portable information processing terminal within said coverage, and
calculate a distance from said another portable information processing terminal based on obtained said position data representing the position of said portable information processing terminal and received said position data of another portable information processing terminal, and extract, based on a result of calculation, said reception data in accordance with said set communication condition for wireless communication from the received data.

3. The non-transitory storage medium according to claim 1, wherein
said one or more processors are further configured to perform said prescribed information processing based on the received position data from said another portable information processing terminal.

4. The non-transitory storage medium according to claim 1, wherein
said one or more processors are configured to set the communication condition for said wireless communication for each application.

5. The non-transitory storage medium according to claim 1, wherein
said one or more processors are configured to set a condition for the coverage of said wireless communication as said communication condition, based on obtained said information.

6. The non-transitory storage medium according to claim 1, wherein the received data includes first data that is compatible with the set communication condition and second data that is not compatible with the set communication condition.

* * * * *